United States Patent Office 2,921,876
Patented Jan. 19, 1960

2,921,876
ACTIVATION OF ALUMINUM

Elmer H. Dobratz, Pittsburgh, Pa., assignor to Koppers Company, Inc., a corporation of Delaware No Drawing. Application July 13, 1955
Serial No. 521,902

10 Claims. (Cl. 148—13.1)

This application is concerned with a method of activating aluminum to be used in the preparation of organic compounds. It is particularly concerned with the method for the activation of aluminum to be used in preparation of alkylaluminums.

Heretofore in order to activate or prepare aluminum for use in reactions such as the preparation of tri-alkylaluminums from the aluminum, an alkene-1 and hydrogen, it has been necessary to resort to mechanical treatment such as, for example, milling, for example, in the presence of an alkyl-aluminum or by spraying molten aluminum into a protective liquid thereby producing a finely divided active material. Additionally, it has been observed that not all forms of aluminum are satisfactory as starting materials to be subjected to the milling or spraying treatments. In those instances wherein a particular aluminum did not satisfactorily respond to such mechanical treatments, it has been customary to discard that aluminum and seek a different source.

Additionally, it has been necessary to protect the surface of the aluminum which has undergone the mechanical treatment to prevent oxidation thereof in order to retain the activity. This has been accomplished for example, by milling in the presence of, for example, a trialkylaluminum.

In a different type of organic reaction, it is known to utilize aluminum to produce hexachloroethane by reaction with carbon tetrachloride. However, ordinary aluminum when utilized in this process has a considerable induction period before the desired reaction takes place. Thus, the aluminum at first is inactive in this organic reaction and it is only after, for example, boiling for approximately for one hour in the presence of carbon tetrachloride that it is activated and the desired reaction occurs.

It has now been discovered as a feature of this invention, that it is possible simply and effectively to activate any commercially available aluminum by heating said aluminum to a temperature above about 150° C. in the presence of hydrogen and of an organometallic compound, i.e., a compound wherein an alkyl or aryl radical is bonded to a metal by a carbon-metal bond, designated broadly herein by the formula R—M. It will be realized that this formula embraces organometallics in which a plurality of alkyl or aryl radicals are bonded to a metal atom. Conveniently the temperature of treatment is below the ultimate decomposition temperature of the compound utilized in the treatment of the aluminum.

In a preferred embodiment of the invention an organometallic compound which is liquid at temperatures about 150° C. or which is soluble in an inert organic solvent at such temperature is contacted with inactive aluminum at a temperature above about 150° C. and below the ultimate decomposition temperature of the activator. In a further preferred embodiment there is used as an activator an organometallic compound which is either liquid, or soluble in an inert organic solvent, at a temperature of about 150° C. in which the metal is one which is above hydrogen in the electrochemical series.

Utilizing organometallic compounds of metals above hydrogen in the electrochemical series, it is possible to operate at relatively higher activation temperatures than when utilizing organometallic compounds of metals below hydrogen in the electrochemical series. This enables the activation to be accomplished in a lesser period of time.

Illustrative of the "activators" of this invention, that is, the compounds R—M as described above are such compounds as, for example, tri-ethylaluminum, tri-methylaluminum, penta-methylantimony, tri-ethylantimony, tri-methylantimony, di-n-butylberyllium, di-ethylberyllium, di-methylberyllium, di-propylberyllium, methylbismuthine,, tri-ethylbismuthine, tri-methylbismuthine, tri-phenylbismuthine, tri-ethylboron, di-iso-amylcadmium, di-butylcadmium, di-isobutylcadmium, di-ethylcadmium, di-methylcadmium, di-propylcadmium, tri-ethylgallium, tri-methylgallium, tetra-ethyllead, tetra-methyllead, tetra-phenyllead, tri-ethyllead, di-ethyl-di-isoamyltin, di-ethyl-di-isobutyltin, di-ethyltin, di-methyl-di-isobutyltin, di-methyl-di-ethyltin, di-p-tolyltin, di-p-xylyltin, ethyl-n-propyl; di-iso-amyltin, tetra-iso-amyltin, tetra-benzyltin, tetra-isobutyltin, tetra-cyclohexyltin, tetra-ethyltin, tetra-methyltin, tetra-propyltin, tetra-o-tolyltin, tetra-m-tolyltin, tetra-p-tolyltin, tetra-m-xylyltin, tetra-p-xylyltin, tri-isobutyl-iso-amyltin, tri-isobutylathyltin, tri-ethyl-iso-amyltin, tri-ethyl-isobutyltin, tri-ethylphenyltin, tri-ethyl-n-propyltin, tri-ethyltin, tri-methylethyltin, tri-methyltin, tri-phenylbenzyltin, tri-phenylethyltin, tri-phenylmethyltin, di-ethylzinc, and tetra-phenylgermanium.

The present invention comprises a process for the activation of aluminum useful in the preparation of organic compounds, comprising heating inactive aluminum in the presence of hydrogen and of a compound of the formula R—M as heretofore described at a temperature of at least about 150° C. and below the ultimate decomposition temperature of said compound.

Further, the present invention contemplates a process for the activation of aluminum useful in the preparation of organic compounds comprising heating inactive aluminum in the presence of hydrogen and of a compound R—M, as described above, at a temperature above about 150° C. and below the ultimate decomposition temperature of said alkylaluminum for a period of time of at least about ½ hour.

It has been observed that some activation of the aluminum is obtained immediately upon reaching the temperature about 150° C. However, it is desirable and preferred to maintain the temperature at or above about 150° C. for a period of time of about ½ hour or more in order to attain complete activation of the aluminum being treated.

It will be noted that the present invention eliminates the step of utilizing the heretofore required mechanical treatments which are both costly and time-consuming. A further feature of the invention resides in the fact that rather than it being required that a specific grade or type of aluminum such as, for example, grained aluminum, be utilized, there can now be used any commercially available aluminum.

The term "ultimate decomposition temperature" is intended to mean the temperature at which the last remaining carbon-metal bond is broken. Thus, for example, while a tri-alkylaluminum can "decompose" to yield a di-alkylaluminum hydride and an alkene, this decomposition is not an "ultimate" decomposition since the di-alkylaluminum hydride can "decompose" further to yield a mono-alkylaluminum dihydride and an alkene.

As used herein the terms "parts" and "percent" mean parts and percent by weight unless otherwise specified.

The process of this invention is applicable particularly to the activation of aluminum useful in the preparation of a wide variety of alkylaluminums, such as, for example, tri-isobutylaluminum, tri-ethylaluminum, tri-propylaluminum, tri-octylaluminum, tri-decylaluminum and the like, as well as the mono- and di-alkylaluminum hydrides.

The aluminum to be utilized in the present invention preferably is in the comminuted form such as, for example, a pigment grade aluminum for either paint or varnish. Alternatively, the aluminum can have been comminuted by milling, by drilling or the like. It is to be noted that while these are mechanical operations, it is not necessary when utilizing the present invention that these operations be conducted in such a manner as to protect the surface of the aluminum from, for example, oxidation. Such aluminums, when milled in the absence of a protective atmosphere, are useless in the aforedescribed organic processes unless they are subjected to a further and additional mechanical treatment in a protective atmosphere. Thus, they must be, for example, milled, allowed to undergo an induction period, or specially prepared by such as being sprayed into a protective atmosphere. However, the present invention provides a new method of activating the aluminum without resorting to heretofore known procedures.

Broadly, utilizing the present invention, the activation of aluminum is accomplished by placing the inactive aluminum in comminuted form in a suitable reaction vessel, adding thereto an amount of a compound, R—M, sufficient to immerse the aluminum, adding hydrogen, and thereafter heating the contents of the vessel to a temperature above about 150° C. and below the ultimate decomposition temperature of the particular compound being utilized preferably for a period of at least about ½ hour. It will be realized that rather than utilizing solely a compound to submerge the aluminum there can be utilized a solution or dispersion of said compound in a suitable inert liquid such as, for example, pentane, cylopentane, hexane, cyclohexane, heptane, cycloheptane, octane, nonane, decane, decahydronaphthalene and the like. In general, it is desirable that there be present in the system a minimum of about 5–10% of activator based on the amount of aluminum being activated.

It is to be noted that the present invention finds particular utility in the activation of aluminums for the preparation of tri-alkylaluminum. These tri-alkylaluminums are useful per se as catalysts for a variety of polymerization reactions and can be further utilized as the starting point for preparation of other catalysts similarly useful.

The following examples are illustrative but not limitative of the present invention:

*Example I*

To a suitable pressure vessel equipped with an agitator then is added 300 parts of aluminum chips prepared by drilling an aluminum ingot on an ordinary drill press and 400 parts of di-n-butylberyllium. The autoclave is then pressurized to 200 p.s.i.g. with hydrogen, agitation is commenced and the system is heated to and maintained at 190° C. for a period of approximately 3 hours. The autoclave and its contents are then cooled to 135° C. and there is added under pressure 1000 parts of isobutylene and hydrogen is added to the system to produce a pressure of approximately 2,000 p.s.i.g. Heating and agitation are continued for approximately 15 hours. During this period, the pressure in the system is maintained at 1500–2000 by the addition of hydrogen as required by the pressure drop in the system. The reaction vessel is cooled to approximately 70° C. and the system vented.

After separation of the unreacted aluminum, the contents of the reaction vessel are distilled. There are obtained 350 parts of dibutyl beryllium boiling at approximately 170° C. at a pressure of 25 millimeters of mercury and 625 parts of tri-isobutylaluminum, boiling at 33° C. at a pressure of 1/10 millimeter of mercury.

*Example II*

The procedure of Example I is repeated, substituting, for the aluminum drillings there utilized, 300 parts of aluminum flakes having an apparent density of 0.5 gram per ml. and an average particle size of approximately 10–20 microns. The results are substantially similar to those obtained in Example I.

*Example III*

The procedure of Example I is repeated, substituting for the aluminum drillings an equal weight of aluminum powder having an apparent density 1.2, approximately 2–5% of which is retained on a 100 mesh screen, and 80% of which passes through a 325 mesh screen. However, activation is carried out at 235° C. for 2 hours which yields substantially similar results to those obtained in Example I at an activation temperature of 190° C.

*Example IV*

Example I is repeated substituting an equal weight of di-n-butylaluminum for the di-n-butylberyllium there utilized. Results are inferior to those obtained in Example I. There is obtained 487 parts of tri-isobutylaluminum.

Repetition of Example II utilizing di-n-butylcadmium instead of the di-n-butylberyllium there utilized, yields results substantially similar to those obtained in Example IV.

Repetition of Example III, utilizing di-n-butylcadmium instead of the di-n-butylaluminum there utilized, yields results substantially similar to those obtained in Example IV.

*Example V*

Example I is repeated substituting an equal weight of dimethyl-di-ethyltin for the di-n-butylberyllium there utilized. There is obtained 515 parts of tri-isobutylaluminum.

*Example VI*

Example I is repeated substituing an equal weight of ethyl-n-propyl-di-iso-amyltin for the di-n-butylberyllium there utilized. There is obtained 493 parts of tri-isobutylaluminum.

*Example VII*

Example I is repeated substituting an equal weight of tetra-ethylgermanium for the di-n-butylberyllium there utilized. There is obtained 430 parts of tri-isobutylaluminum.

While the foregoing examples illustrate the activation of aluminum with an activator of the present invention in the presence of hydrogen, it will be understood that hydrogen is not absolutely essential and that activation can be accomplished utilizing solely an activator.

What is claimed is:

1. A process by which aluminum that is inactive because it has not been protected from oxidation is activated so that it can be used in the preparation of organic compounds, which process comprises heating said inactive aluminum in the presence of hydrogen and a compound containing a hydrocarbon radical bonded to a metal by a carbon-metal bond at a temperature of at least about 150° C. and below the ultimate decomposition temperature of said last-mentioned compound whereby said inactive aluminum is activated.

2. A process by which aluminum that is inactive because it has not been protected from oxidation is activated so that it can be used in the preparation of organic compounds, which process comprises heating said inactive aluminum in the presence of hydrogen and an organometallic compound of a metal above hydrogen in the electrochemical series of metals at a temperature of at least about 150° C. and below the ultimate decomposition temperature of said last-mentioned compound whereby said inactive aluminum is activated.

3. A process by which aluminum that is inactive because it has not been protected from oxidation is activated so that it can be used in the preparation of organic compounds, which process comprises heating said inactive aluminum, in the presence of hydrogen and an organometallic compound, liquid and stable at about 150° C., at a temperature at least about 150° C. and below the ultimate decomposition temperature of said last-mentioned compound whereby said inactive aluminum is activated.

4. A process by which aluminum that is inactive because it has not been protected from oxidation is activated so that it can be used in the preparation of organic compounds, which process comprises heating said inactive aluminum, in the presence of hydrogen and an organometallic compound soluble at 150° C. in an inert organic solvent, at a temperature of at least about 150° C. and below the ultimate decomposition temperature of said last-mentioned compound whereby said inactive aluminum is activated.

5. A process by which aluminum that is inactive because it has not been protected from oxidation is activated so that it can be used in the preparation of organic compounds, which process comprises heating at a temperature of at least 150° C. and below the ultimate decomposition temperature of said organometallic compound said inactive aluminum in the presence of hydrogen and an organometallic compound containing a hydrocarbon radical bonded by a carbon-metal bond to a metal above hydrogen in the electrochemical series whereby said inactive aluminum is activated.

6. The process of claim 1 in which organometallic compound is di-n-butyl beryllium.

7. The process of claim 1 in which organometallic compound is di-n-butylcadmium.

8. The process of claim 1 in which organometallic compound is di-methyl-di-ethyltin.

9. The process of claim 1 in which organometallic compound is ethyl-n-propyl-di-isoamyltin.

10. The process of claim 1 in which organometallic compound is tetra-ethylgermanium.

References Cited in the file of this patent

UNITED STATES PATENTS

| | | |
|---|---|---|
| 2,271,956 | Ruthruff | Feb. 3, 1942 |
| 2,388,428 | Mavity | Nov. 6, 1945 |
| 2,404,599 | Sanderson | July 23, 1946 |
| 2,691,668 | Ziegler et al. | Oct. 12, 1954 |
| 2,787,626 | Redman | Apr. 2, 1957 |

FOREIGN PATENTS

| | | |
|---|---|---|
| 535,235 | Belgium | Feb. 15, 1955 |

OTHER REFERENCES

"Journal of Organic Chemistry," vol. 5, No. 2, March 1940, pages 106–121.